United States Patent [19]

Shino

[11] Patent Number: 4,843,223
[45] Date of Patent: Jun. 27, 1989

[54] INFORMATION PROCESSING DEVICE FOR IC CARD

[75] Inventor: Katsuhide Shino, Nara, Japan

[73] Assignee: Sharp Kabushiki Kaisha, Osaka, Japan

[21] Appl. No.: 940,447

[22] Filed: Dec. 11, 1986

[30] Foreign Application Priority Data

Dec. 11, 1985 [JP] Japan .................. 60-278448

[51] Int. Cl.⁴ .................. G06K 7/06; G06K 19/00
[52] U.S. Cl. .................. 235/487; 235/441; 365/52
[58] Field of Search .................. 235/487, 493, 61 PL, 235/58 R, 419, 441; 365/52, 55, 58

[56] References Cited

U.S. PATENT DOCUMENTS 3,883,856 5/1975 Saito et al. .

FOREIGN PATENT DOCUMENTS 2349548 4/1974 Fed. Rep. of Germany .

Primary Examiner—A. D. Pellinen
Assistant Examiner—Leon K. Fuller
Attorney, Agent, or Firm—Birch, Stewart, Kolasch & Birch

[57] ABSTRACT

An information processing device for an IC card for reading out the information stored in an IC, or for reading out and writing in the information comprises a connecting part. In particular, in an IC card incorporating an IC possessing a memory function and having a connecting part on the outside of the IC, a part to be connected with said connecting part of the IC and an openable lid are disposed on the top of the main body of the device, and a card holder for holding said IC card is provided on this lid, and the connecting part of the IC card and the connecting part of the main body are joined together by the opening and closing of the lid.

6 Claims, 3 Drawing Sheets

4,843,223

INFORMATION PROCESSING DEVICE FOR IC CARD

BACKGROUND OF THE INVENTION

This invention relates to an information processing device for IC card to read out the information stored in an IC or read out and write in the information, in an IC card comprising the IC having a memory function and possessing an IC connecting part on its outside.

Recently, the so-called IC cards having an IC possessing a memory function incorporated in a credit card, cash card or the like are spreading, and various devices to process the information stored in such an IC card are proposed.

However, the conventional information processing devices for IC card were complicated in structure, and it was hard to reduce the size and thickness for the entire device.

SUMMARY OF THE INVENTION

It is hence a primary object of the present invention to realize reduction of size and thickness of an information processing device for IC card by simplifying the connecting mechanism of the IC card and the main body of the device by using an openable lid.

It is another object of this invention to present an information processing device for an IC card in such a structure that the IC card and the circuit board in the device main body are electrically connected only by closing the lid, which is smaller in number of movable parts than conventional devices and is hence lower in failure rate.

The information processing device for an IC card of this invention is an information processing device intended to read out the information stored in an IC, or read out and write in the information, on an IC card with the IC possessing a memory function built inside and having this IC connecting part on its outside, in which the part to be connected with said connecting part of the IC card is provided on the top of the main body of the device, and an openable lid is also disposed on top of the device, and a card holding part to hold the IC card is provided on this lid, and the connection of said connecting part of the IC card and said connecting part of the main body of the device is affected by an opening or closing operation of said lid.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 being a longitudinal sectional view and

FIG. 2 being a perspective view, and

FIG. 3 being a longitudinal sectional view,

FIG. 4 being a perspective view, and

FIG. 5 being a plan view.

DESCRIPTION OF THE PREFERRED EMBODIMENTS (Embodiment 1)

Figure 1:
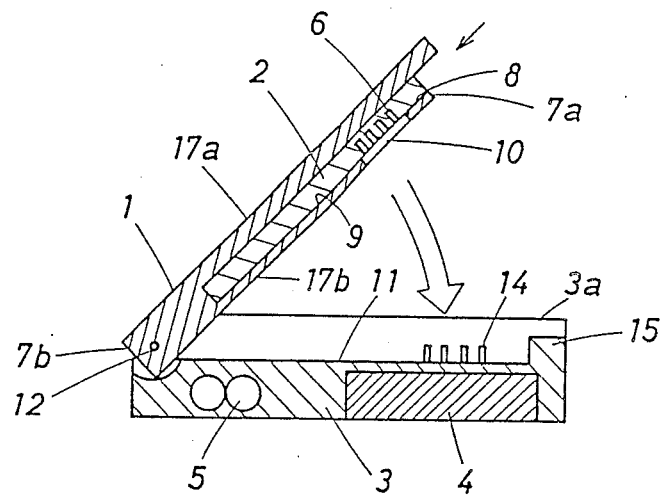
FIG. 1 and FIG. 2 show a first embodiment of the present invention.
Figure 2:
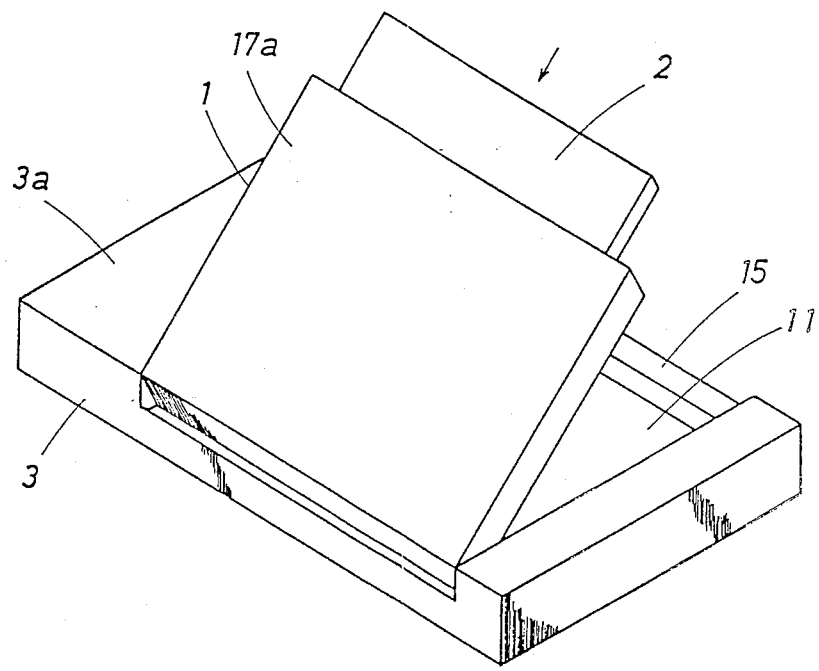

An information processing device for an IC card of this embodiment is shown in FIG. 1 and FIG. 2.

In the drawings, numeral 1 is a lid to hold an IC card, and numeral 3 represents a main body of the device.

The IC card 2, although omitted in the drawing, incorporates an IC possessing a memory function and a power source for memory protection. A connector (connecting part) 6 is connected to this IC at the back side thereof.

The lid 1 is formed approximately in a square shape having such a thickness to accommodate said IC card 2, and a cart insertion slit or pocket 8 which is slightly wider than the width of the IC card 2 is formed at a rear end 7a, while a groove-shaped card holder 9 which has a depth nearly equal to the length of the IC card 2 is formed from this card insertion slit or pocket 8 toward a front end 7b of the lid body 1. Besides, an opening 10 is provided at a lower side 17b of the lid 1 so that the connector 6 provided at the back of the IC card 2 may be exposed outside the lid 1 when the IC card 2 is fully inserted into said card holder 9.

The main body 3 of the device comprises a circuit board 4 mounting circuit parts for reading out the information stored in the IC card 2, or reading out and writing in the information, and a main power source 5 for driving this circuit board 4. An engaging dent or recess 11 which is almost similar to the outer shape of the lid 1 and nearly equal to the thickness of the lid 1 is formed on the top 3a of the main body. The front ends of the right and left sides of the engaging dent or recess 11, and the front ends of the right and left sides of the lid 1 are linked together by a support shaft or pivot means 12. The lid 1 is designed to be opened and closed on the main body 3 around this support shaft 12. In the closed state of the lid 1, that is, in the state when the lid 1 is engaged in the engaging dent recess 11, the top 17a of the lid 1 and the top 3a of the device main body 3 are flush. In the bottom of the engaging dent or recess 11, a connecting terminal (plug means) 14 is provided, being projected, at a position to be matched with the opening 10 in the lid 1. This plug means 14 is a terminal to connect with the connector 6 disposed on the back side of the IC card 2, and it is electrically connected with said circuit board 4 housed inside the main body 3. At the rear end of the engaging dent 11, a step part 15 is provided over the whole length in the widthwise direction. This step part 15 is intended to plug the cart insertion slit 8 to prevent the IC card 2 from slipping out of the card holder 9 when the lid 1 is positioned in the engaging dent 11.

When using the information processing device for an IC card in the above-mentioned construction, first the lid 1 is opened, that is, raised in the front direction (the state indicated in the drawing), and the IC card 2 is placed in the card holder 9. Then, by merely closing the lid 1, the plug means 14 is inserted into the connector 6, and the IC housed in the IC card 2 and the circuit board housed in the main body 3 are electrically connected.

(Embodiment 2)

Figure 3:
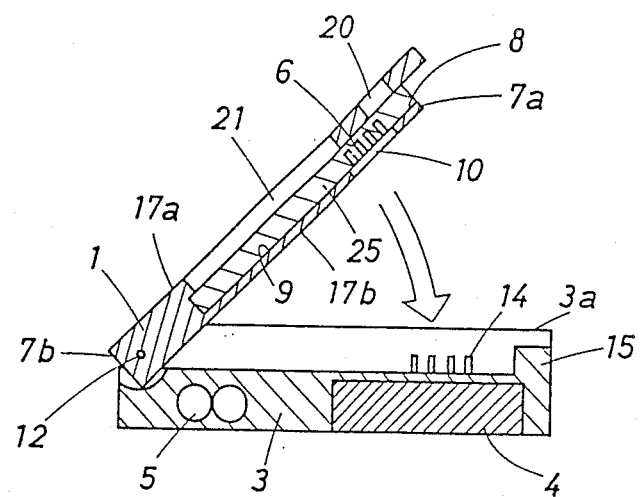
FIG. 3 to FIG. 5 show a second embodiment of the present invention.
Figure 4:
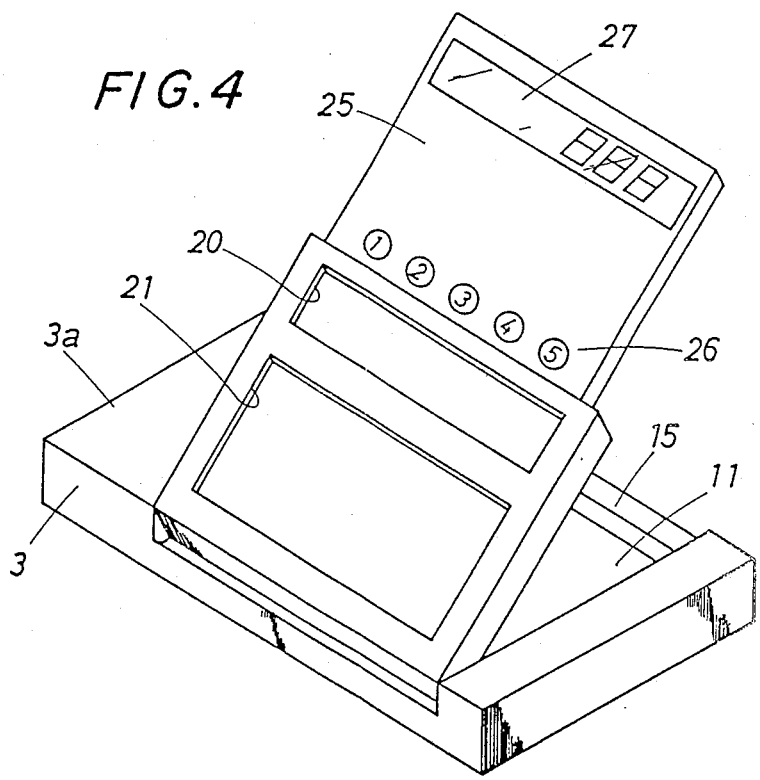
Figure 5:
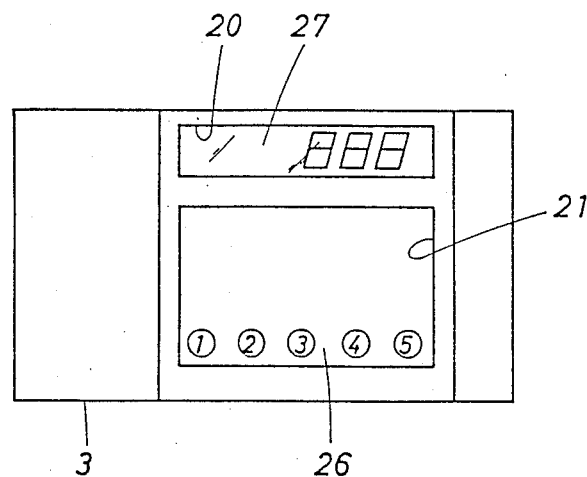

The information processing device for an IC card of this embodiment is shown in FIG. 3 to FIG. 5.

In this embodiment, upper opening 20 and lower opening 21 of a proper shape and extending to the card holder 9 are disposed on the top 17a of the lid 1. The other components are the same as in first embodiment, and the same reference numerals are given to the same materials and same parts.

The information processing device for an IC card of this embodiment is most effectively utilized when using a card having a small power source capacity for reading and reading by the IC card itself, such as an IC card 25 with display unit 27. That is, for key operation and display, the key operation part 26 and display unit 27 such as an LCD provided in the IC card with memory 25 can be directly used, and a main power source 5 installed in the main body 3 can be used. In this case, as shown in FIG..5, the upper opening 20 serves as the display window for display unit 27, while the lower opening 21 is used as the operation access to the key operation unit 26. In this embodiment, meanwhile, two openings are provided, but it is also possible to form only one opening, in which the key operation part 26 and display unit 27 of the IC card with memory 25 may be incorporated.

Thus, by disposing an opening on the top of the lid 1, it is possible to develop into various applications with higher added values.

According to this invention, by putting an IC card into the card holder of the lid 1 which is openably attached to the main body 3 and closing the lid, the connecting part provided in the IC card and the part to be connected provided on the top of the main body are joined together, and the IC built in the IC card and the circuit parts mounted on the main body are electrically connected.

While only certain embodiment of the present invention have been described, it will be apparent to those skilled in the art that various changes and modifications may be made therein without departing from spirit and scope of the present invention as claimed.

What is claimed is:

1. An information processing device for an IC card, said IC card being one of a card which can read out information stored therein and a card which can read out and write in the information, said IC card having an IC with a memory and having a connecting part, said device comprising:

a lid having a pocket formed therein, said pocket being defined by at least an upper wall, a lower wall, and an end wall, said pocket being stationary relative to said lid, said lower wall of said pocket having an opening therein, said opening extending over a minority of said lower wall, and said pocket having an access through which said IC card can be inserted into engagement with said pocket, said connecting part of the IC card being aligned with the opening when inserted into said pocket;

a main body having a recess formed therein, said main body having a circuit board attached thereto;

pivot means for pivotably attaching said lid to said main body, said lid being movable from an open position whereat said IC card can be inserted into said pocket and a closed position whereat said IC card in the pocket is received in the recess of said main body, the lid and main body forming a relatively thin enclosure when said lid is pivoted to said closed position; and plug means extending through said main body from said circuit board into said recess, said plug means being positioned to extend through the opening of the lower wall of the lid and into operative engagement with said connecting part of said IC card when said lid is pivoted to the closed position.

2. The information processing device as recited in claims 1, wherein said upper wall of said lid has at least one opening therein for access to said IC card when said IC card is inserted into the pocket and said lid is in the closed position whereby at least one of a display unit or a key operation part on said IC card can be accessed.

3. The information processing device as recited in claim 1, wherein said main body has said circuit board attached to a lower side thereof and said circuit board is generally flush with said lower side of the main body whereby said main body is generally flat throughout the lower side thereof.

4. The information processing device as recited in claim 1, wherein said plug means is stationary relative to said main body.

5. The information processing device as recited in claim 1, further comprising a power source provided in said main body, said power source being operatively connected to said circuit board.

6. The information processing device as recited in claim 1, wherein said lid and said main body form a generally rectangular and relatively compact configuration when said lid is in the closed position.

* * * * *